(12) United States Patent
Lin

(10) Patent No.: US 7,772,968 B2
(45) Date of Patent: Aug. 10, 2010

(54) ALARM SYSTEM FOR A VEHICLE

(75) Inventor: Yung-Shan Lin, Ping-Tung Hsien (TW)

(73) Assignee: Lite-On Technology Corp., Taipei (TW)

( * ) Notice: Subject to any disclaimer, the term of this patent is extended or adjusted under 35 U.S.C. 154(b) by 368 days.

(21) Appl. No.: 11/870,423

(22) Filed: Oct. 11, 2007

(65) Prior Publication Data

US 2008/0231435 A1  Sep. 25, 2008

(30) Foreign Application Priority Data

Mar. 22, 2007 (TW) .............................. 96109986 A

(51) Int. Cl.
- *B60Q 1/00* (2006.01)
- *G08G 1/16* (2006.01)
- *G01C 3/08* (2006.01)
- *G01P 3/40* (2006.01)
- *G06M 7/00* (2006.01)

(52) U.S. Cl. ...................... 340/435; 340/903; 356/5.01; 356/28; 250/221

(58) Field of Classification Search ................. 340/435, 340/903; 356/5.01
See application file for complete search history.

(56) References Cited

U.S. PATENT DOCUMENTS

| 4,257,703 A | * | 3/1981 | Goodrich | 356/4.03 |
|---|---|---|---|---|
| 4,552,456 A | | 11/1985 | Endo | |
| 5,283,622 A | | 2/1994 | Ueno et al. | |
| 5,428,439 A | * | 6/1995 | Parker et al. | 356/5.01 |
| 5,489,149 A | * | 2/1996 | Akasu | 356/5.01 |
| 5,594,413 A | | 1/1997 | Cho et al. | |
| 7,164,118 B2 | * | 1/2007 | Anderson et al. | 250/221 |
| 7,324,218 B2 | * | 1/2008 | Stierle et al. | 356/614 |
| 2003/0151785 A1 | * | 8/2003 | Vertoprakhov | 359/15 |
| 2007/0181810 A1 | * | 8/2007 | Tan et al. | 250/341.1 |
| 2007/0201795 A1 | * | 8/2007 | Rice et al. | 385/39 |
| 2008/0169912 A1 | * | 7/2008 | Kawasaki | 340/425.5 |

FOREIGN PATENT DOCUMENTS

| JP | 10123252 (A) | * | 5/1998 |
|---|---|---|---|
| TW | I298302 | | 7/2008 |

* cited by examiner

*Primary Examiner*—George A Bugg
*Assistant Examiner*—Jack Wang
(74) *Attorney, Agent, or Firm*—Rosenberg, Klein & Lee

(57) ABSTRACT

An alarm system for a vehicle includes a first diffraction raster, a first light source for emitting light to the first diffraction raster so as to form a first diffraction pattern on an object, an image capturing module for capturing the first diffraction pattern, and a control module electrically connected to the image capturing module for determining a relative position of the vehicle corresponding to the object according the first diffraction pattern captured by the image capturing module.

19 Claims, 8 Drawing Sheets

ALARM SYSTEM FOR A VEHICLE

BACKGROUND OF THE INVENTION

1. Field of the Invention

The present invention relates to an alarm system for a vehicle, especially to an alarm system capable of determining a relative position of a vehicle corresponding to an object and a distance between the vehicle and the object.

2. Description of the Prior Art

As vehicles become more prevalent, drivers are demanding higher and higher standards of safety and comfort. In the past, a rearview mirror and side mirrors are installed to reduce the possibility of car crashes in order to prolong the life of a car. However, these mirrors cannot reflect the actual distance between the car and other vehicles nearby. For example, the side mirrors tend to reduce the size of nearby vehicles by a scale greater than it should be. Thus the driver often has to rely on his instinct and his experience to determine how far the nearby vehicles are. Occasionally the car may collide onto another object when the car is reversing and turning because the driver misjudges the distance between the car and the object. Moreover, there are blind spots which cannot be detected by either the rearview mirror or the side mirrors, so the mirrors are not able to satisfy the basic safety demand. Thanks to the parking distance control system because it can alert the driver when the car is getting too close to another still object. When the car is getting very close to another object, the parking distance control system will beep. Thus the driver would be alerted to pay extra attention when he steers his car.

Presently the parking distance control system mainly utilizes the feedback of ultra sound waves. By calculating the time interval between generating the ultra sound waves and receiving the ultra sound waves, a distance between a vehicle and an object can be derived. However the ultra sound waves greatly decay in the air, they can only be used to detect the presence of other objects very close to the car. Thus the parking distance control system cannot be used to detect objects far away from the vehicle. In the prior art, U.S. Pat. No. 4,552,456 discloses utilizing time differences between emitting and receiving of short waves in many photoelectric components to calculate a distance between cars, however this is costly and is unable to detect if other vehicles have moved into a warning region. U.S. Pat. No. 5,283,622 discloses utilizing the intensity of the reflected light to determine a distance between cars, however the environment often affects the intensity of the reflected light. Thus it is not a suitable collision proof device. Moreover, it cannot be used to detect if other vehicles have moved into a warning region. Lastly U.S. Pat. No. 5,594,413 discloses a method for measuring the distance between cars, but it is also unable to detect if other vehicles have moved into a warning region.

SUMMARY OF THE INVENTION

According to an embodiment of the present invention, an alarm system for a vehicle comprises a first diffraction raster, a first light source for emitting light to the first diffraction raster so as to form a first diffraction pattern on an object, an image capturing module for capturing the first diffraction pattern, and a determination module electrically connected to the image capturing module for determining a relative position of the vehicle corresponding to the object according to the first diffraction pattern captured by the image capturing module.

According to another embodiment of the present invention, an alarm system for a vehicle comprises a first light source for emitting light on an object so as to form a first pattern on the object, a second light source for emitting light on the object so as to form a second pattern on the object, an image capturing module for capturing the first pattern and the second pattern, and a determination module electrically connected to the image capturing module for calculating a distance between the vehicle and the object according to images of the first pattern and the second pattern captured by the image capturing module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
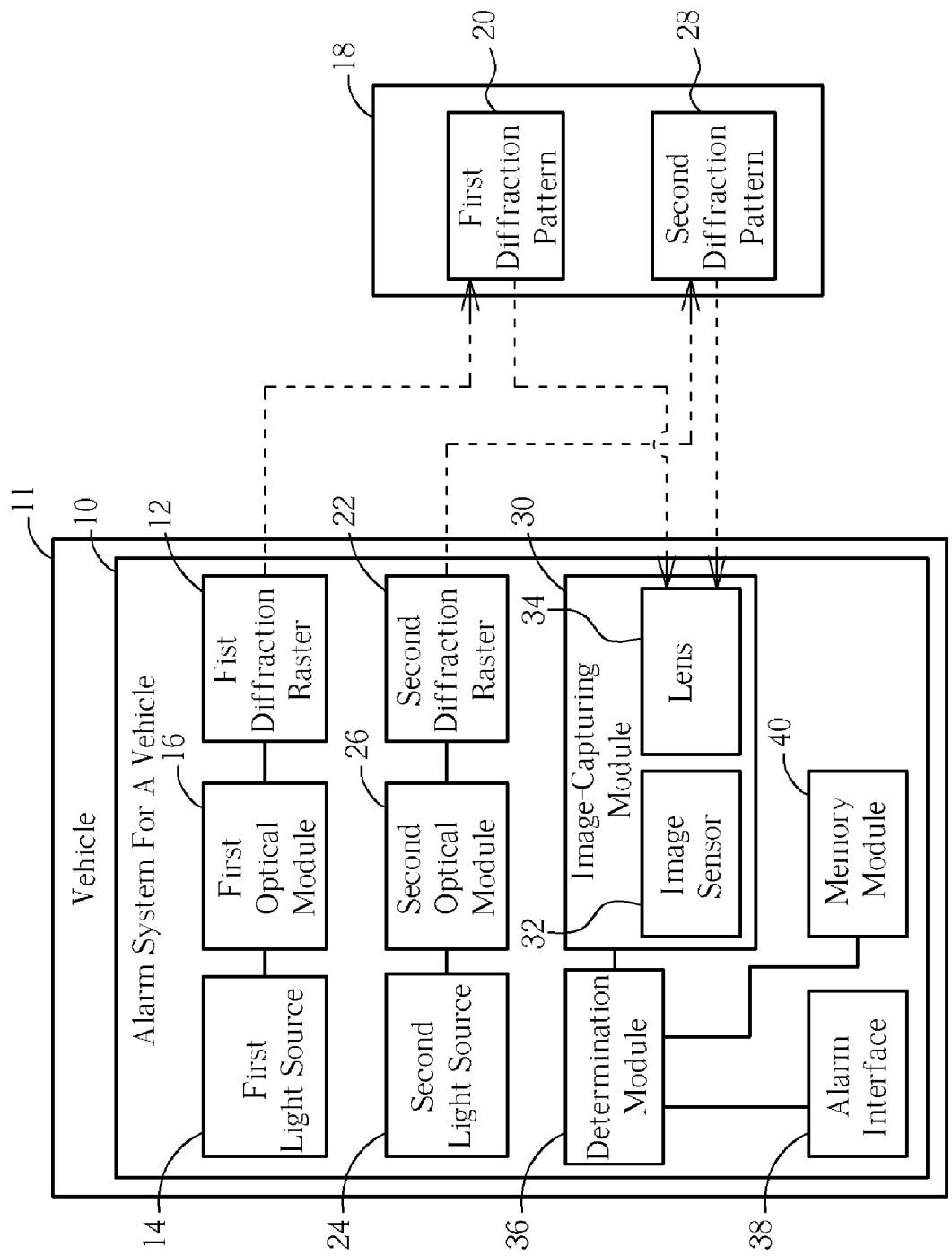
FIG. 1 is a functional block diagram of an alarm system for a vehicle according to the present invention.

Please refer to FIG. 1. FIG. 1 is a functional block diagram of an alarm system 10 for a vehicle according to the present invention. The alarm system 10 is installed inside a vehicle 11 and comprises a fist diffraction raster 12, a first light source 14, a first optical module 16, a second diffraction raster 22, a second light source 24, and a second optical module 26. The first light source 14 can be a laser light source for emitting light to the first diffraction raster 12. The first optical module 16 is used to transform light emitted from the first light source 14 into parallel light beams and project parallel light beams to the first diffraction raster 12 so as to form a first diffraction pattern 20 on an object 18. The object 18 can be a vehicle or other obstacles. The second light source 24 is used to emit light to the second diffraction raster 22. The second optical module 26 is used to transform light emitted from the second light source 24 into parallel light beams and project the parallel light beams to the second diffraction raster 22 so as to form a second diffraction pattern 28 on the object 18. The image-capturing module 30 is used to capture the first diffraction pattern 20 and the second diffraction pattern 28. The image capturing module 30 comprises an image sensor 32 which can be a charge coupled device (CCD), a complementary metal-oxide semiconductor (CMOS) etc., for converting the light signals into electric signals, and a lens 34 for receiving light transmitted from the first diffraction pattern 20 and the second diffraction pattern 28 so as to form images respectively on the image sensor 32.

The alarm system 10 further comprises a determination module 36, an alarm interface 38 and a memory module 40. The determination module 36 is electrically connected to the image capturing module 30 for determining a relative position of the vehicle 11 corresponding to the object 18 according to the first diffraction pattern 20 and the second diffraction pattern 28 captured by the image capturing module 30. The alarm interface 38 is electrically connected to the determination module 36 for generating a warning signal when receiving the determined result from the determination module 36 so as to signal that the object 18 has entered a warning region of the vehicle 11. The alarm interface 38 transmits the warning signal by sound or through image frames. The memory module 40 is electrically connected to the determination module 36 for storing the position of the vehicle 11 corresponding to the object 18.

Figure 2:
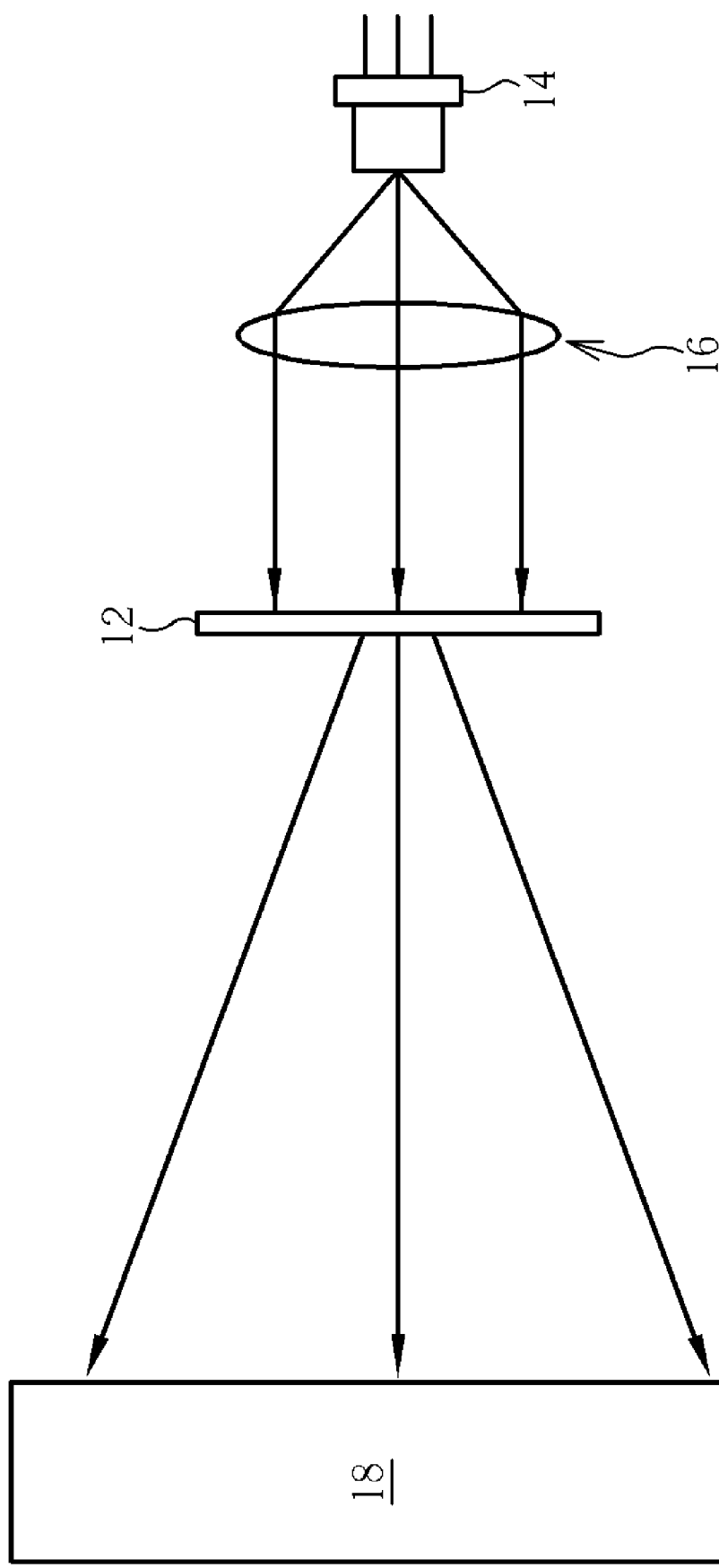
FIG. 2 is an optical diagram of a diffraction pattern generated by the first diffraction raster after receiving light according to the present invention.
Figure 3:
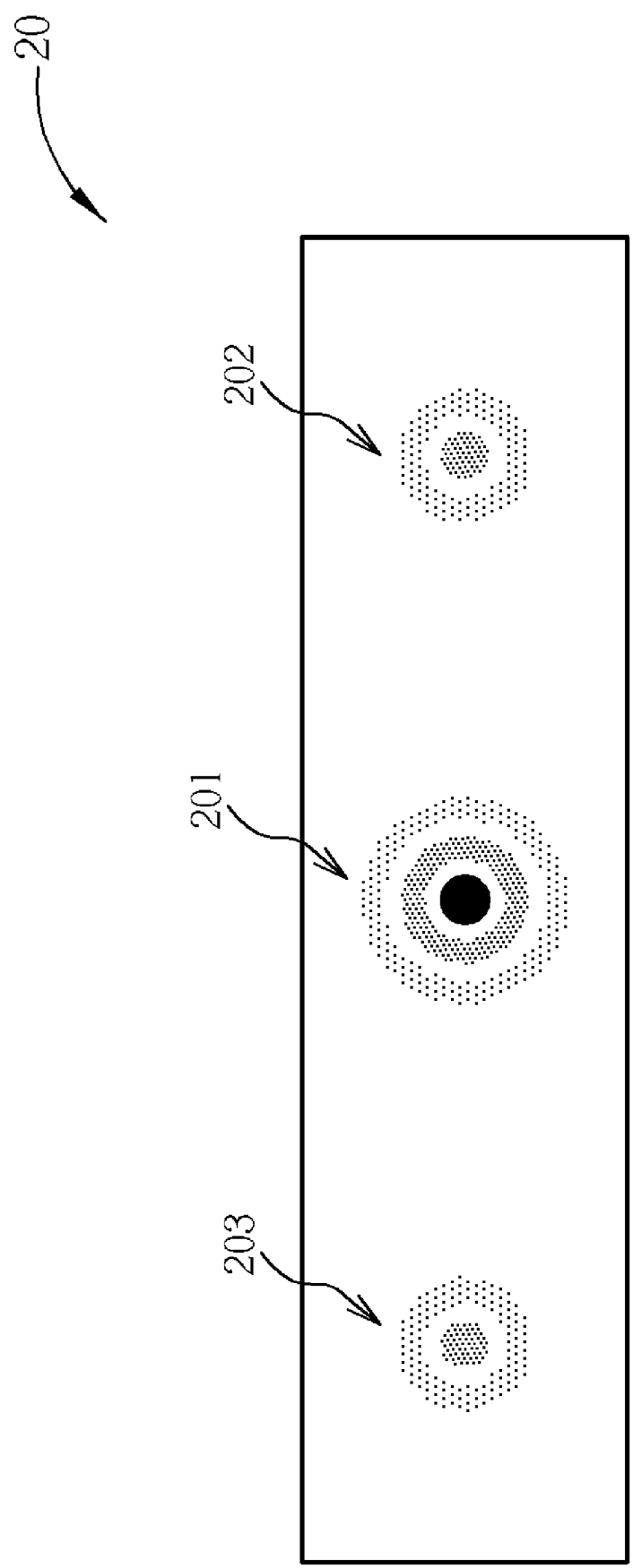
FIG. 3 is a diagram of the first diffraction pattern according to the present invention.
Figure 4:
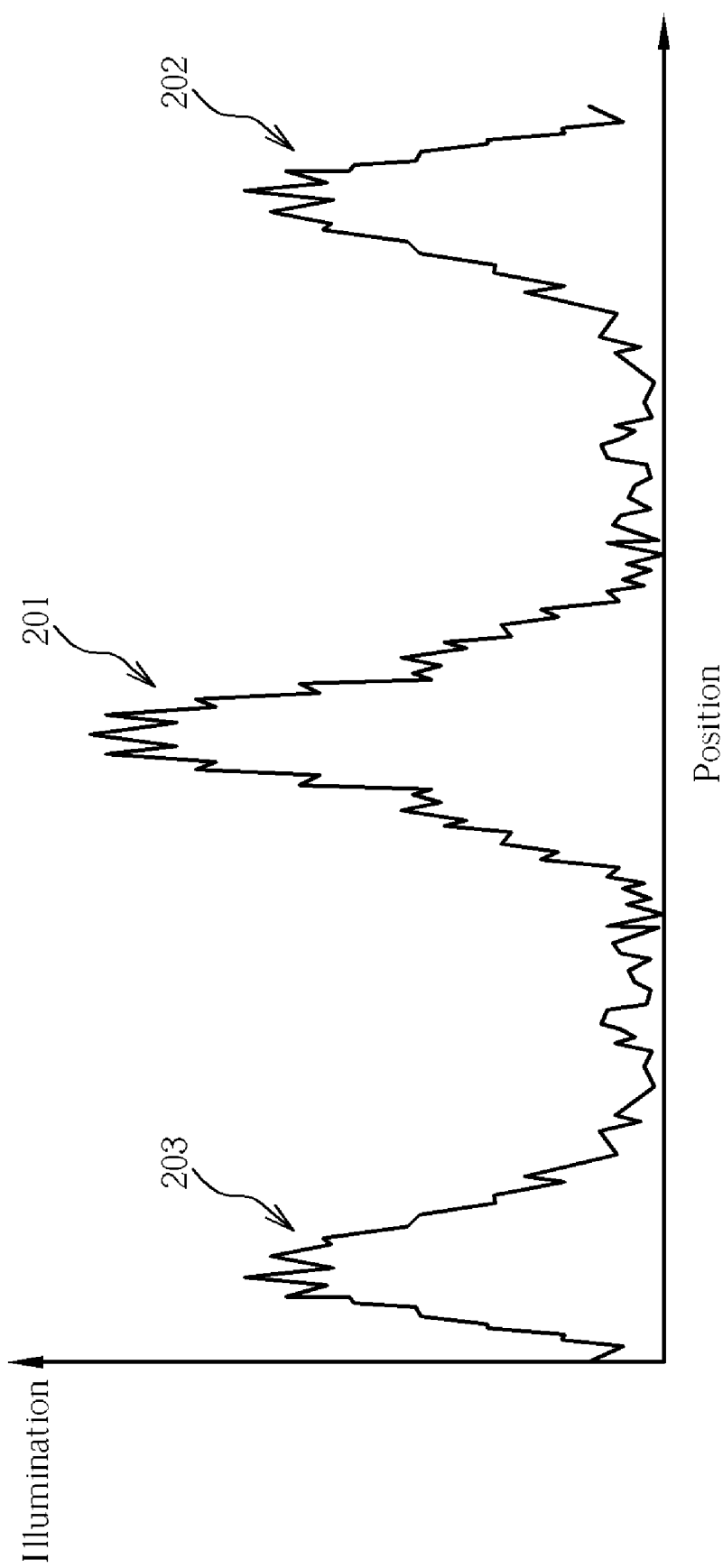
FIG. 4 is a distribution diagram of illumination of the first diffraction pattern according to the present invention.
Figure 5:
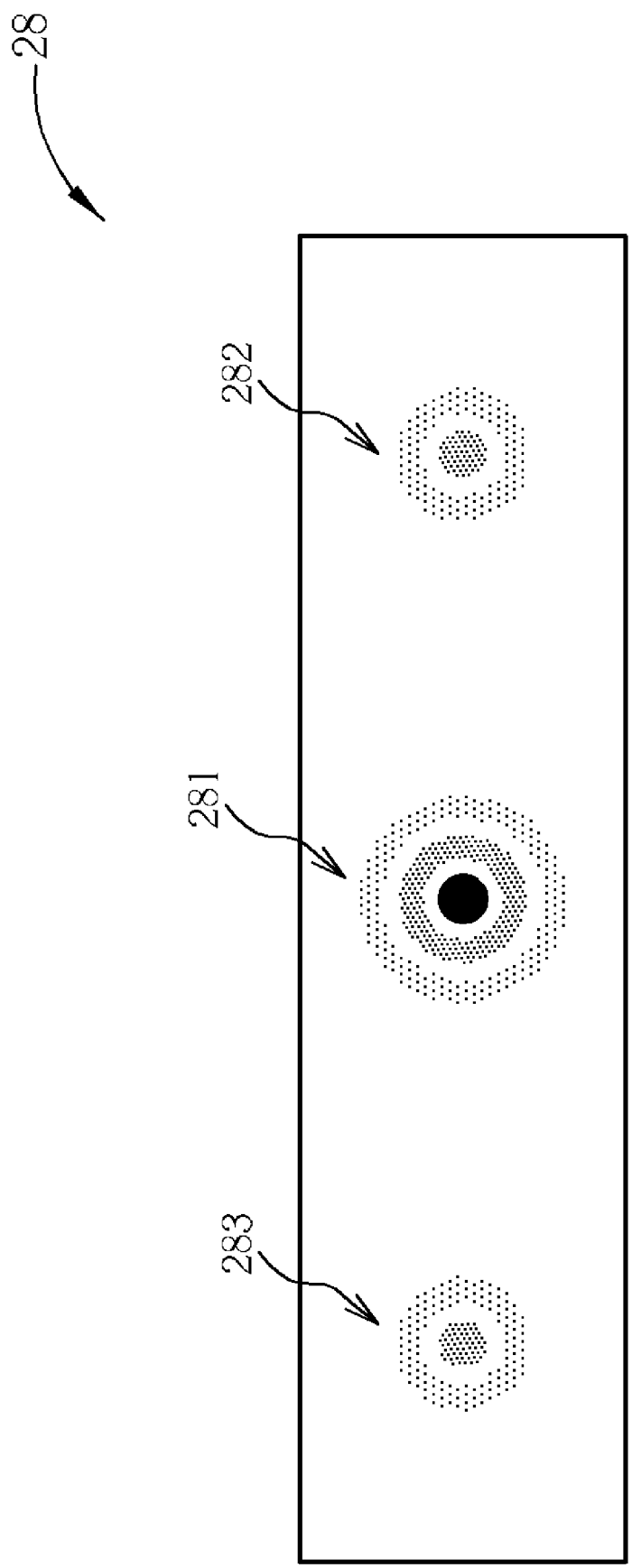
FIG. 5 is a diagram of the second diffraction pattern according to the present invention.

Please refer to FIG. 2, FIG. 3, and FIG. 4. FIG. 2 is an optical diagram of the diffraction pattern generated by the first diffraction raster 12 after receiving light according to the present invention, FIG. 3 is a diagram of the first diffraction pattern 20 according to the present invention, FIG. 4 is a distribution diagram of illumination of the first diffraction pattern 20 according to the present invention. The light emitted from the first light source 14 is transformed into parallel light beams through the first optical module 16, afterwards the parallel light beams are projected to the first diffraction raster 12. Through the diffraction effect caused by the first diffraction raster 12, the parallel light beams are turned into diffraction stripes thus forming a diffraction pattern. The illumination of the diffraction pattern close to the central bright band is the brightest, with the illumination decreasing towards the two ends of the diffraction pattern. The first diffraction pattern 20 includes a central bright band 201, a first side bright band 202 at one side of the first central bright band 201, and a second side bright band 203 at the other side of the first central bright band 201. In fact, there are other bright bands with less illumination in the first diffraction pattern 20 positioned outside the first side bright band 202 and the second side bright band 203, but in this embodiment, only the first central bright band, the first side bright band, and the second side bright band are used as references for determining the relative position of the vehicle 11 corresponding to the object 18. However, the present invention does not confine the determination references to only these three bright bands. The diffraction stripes of other numbers or at other positions can be referenced as well. Similarly, please refer to FIG. 5. FIG. 5 is a diagram of the second diffraction pattern 28 according to the present invention. The second diffraction pattern 28 includes a second central bright band 281, a third side bright band 282 at one side of the second central bright band 281, and a fourth side bright band 283 at the other side of the second central bright band 281. The optical theory of receiving light and generating diffraction patterns by the second diffraction raster 22 and the principle of forming an image are the same as mentioned above, therefore no more description is given here.

Figure 6:
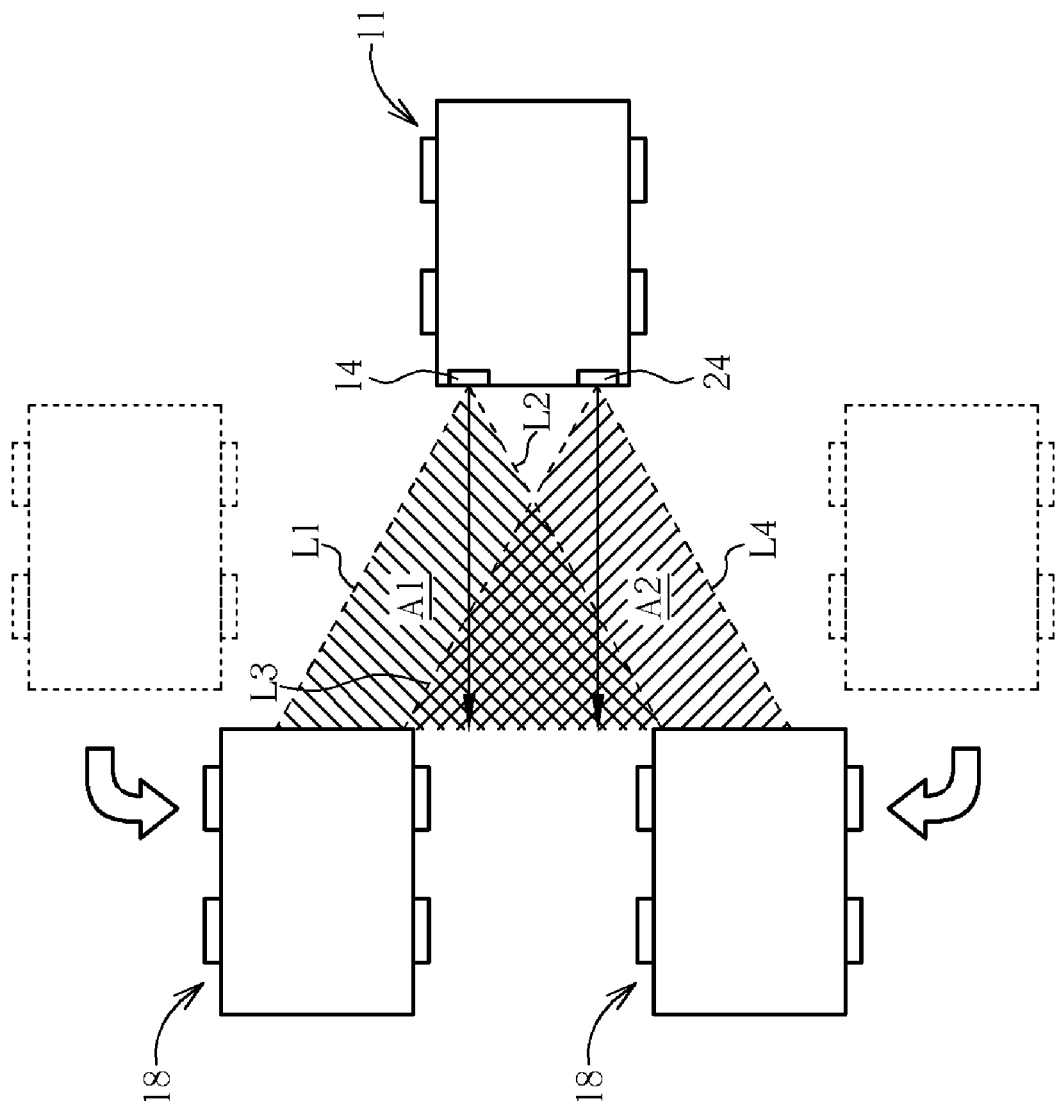
FIG. 6 is a diagram of the different relative positions of a vehicle corresponding to an object according to the present invention.

Please refer to FIG. 6. FIG. 6 is a diagram of the different relative positions of the vehicle 11 corresponding to the object 18 according to the present invention. The present invention can be designed such that when the object 18 enters a first warning region A1 of the vehicle 11 (the region closed in by dotted lines L1 and L2), the first side bright band 202 or the second side bright band 203 of the first diffraction pattern 20 will form an image on the object 18. At this time, the image-capturing module 30 can capture the light transmitted from the images formed by the first side bright band 202 or the second side bright band 203 on the object 18, and then transmit a corresponding signal to the determination module 36. Subsequently, the determination module 36 controls the alarm interface 38 to show a warning signal in order to remind the driver that the object 18 has entered the first warning region A1 of the vehicle 11. Similarly, when the object 18 enters a second warning region A2 of the vehicle 11 (the region enclosed by dotted lines L3 and L4), the third side bright band 282 or the fourth side bright band 283 of the second diffraction pattern 28 forms an image on the object 18. At this time, the image-capturing module 30 captures the light transmitted from the images formed by the third side bright band 282 or the fourth side bright band 283 on the object 18, and then transmits a corresponding signal to the determination module 36. Subsequently, the determination module 36 controls the alarm interface 38 to show a warning signal in order to remind the driver that the object 18 has entered the second warning region A2. From the above description, the alarm system 10 according to the present invention is capable of scanning for other cars entering a warning region. Moreover, the range of the warning region can be decided according to the distance between the central bright band and the second bright band in the diffraction pattern (the distance between the central bright band and the side bright band is proportional to the warning region). This means that by changing the width of the diffraction raster and the wavelength of light emitted from the light source, the distance between the central band and the side band can be adjusted, therefore the purpose of adjusting the warning region of the alarm system 10 can be accomplished.

Figure 7:
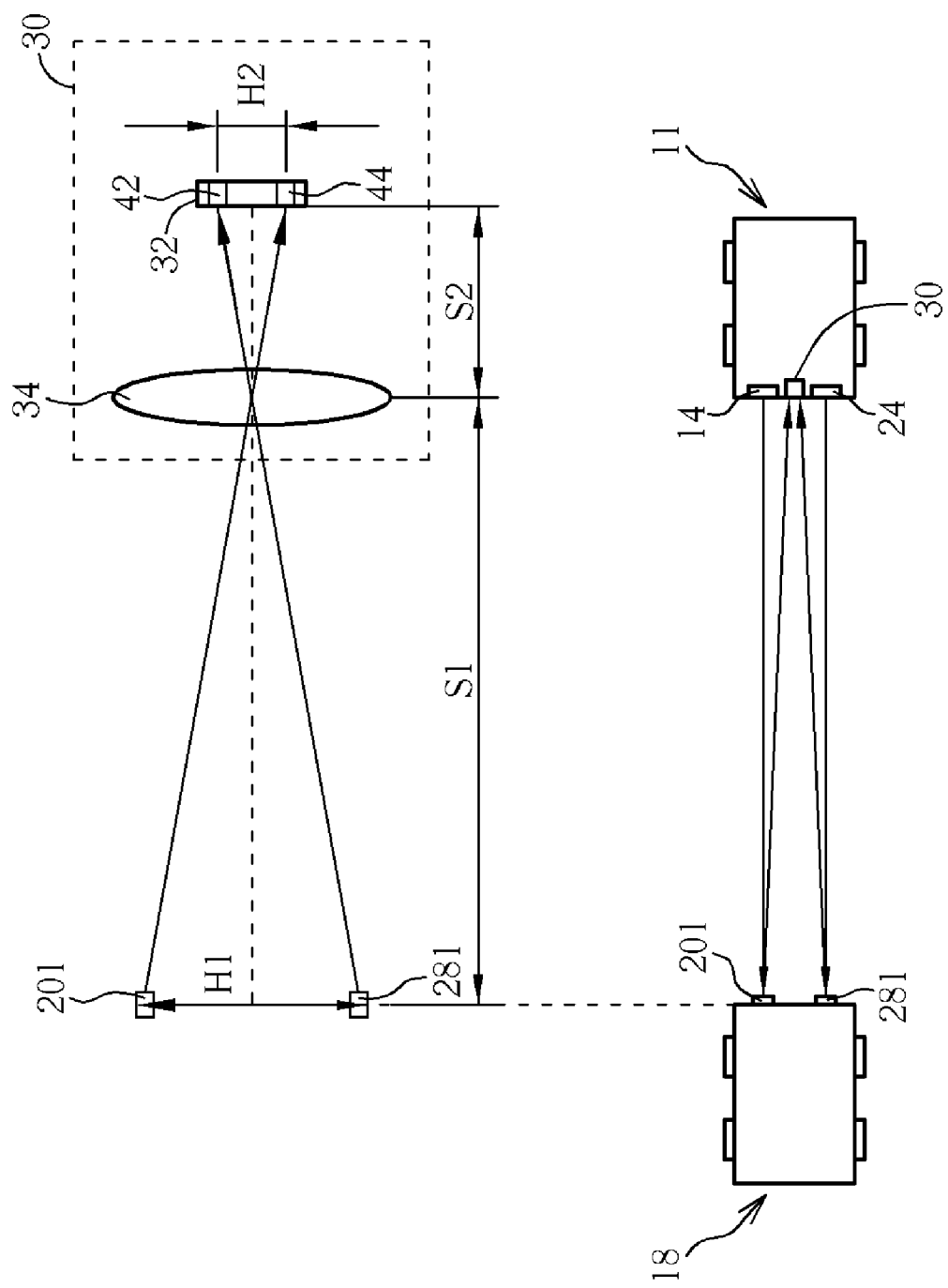
FIG. 7 is an optical path diagram of the first central bright band and the second central bright band forming images on the image sensor according to the present invention.
Figure 8:
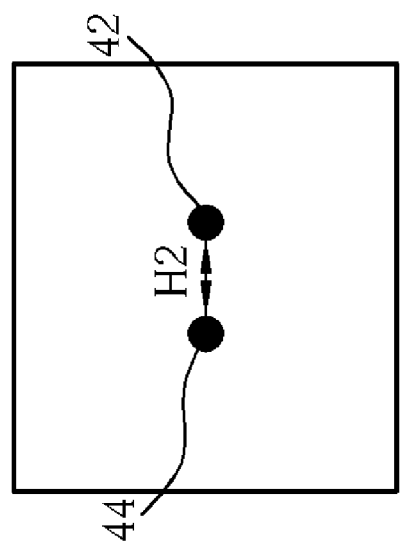
FIG. 8 is a diagram of the first central bright band and the second central bright band forming images on the image sensor according to the present invention.
Figure 8:
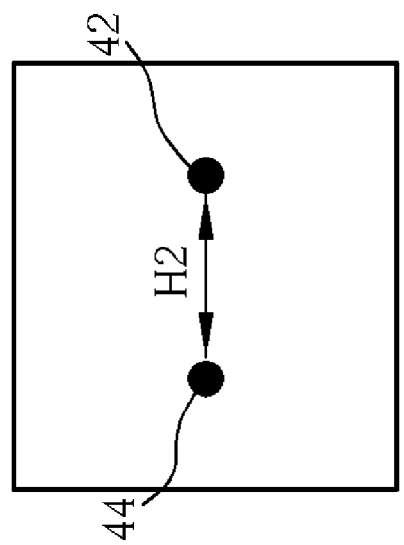
Figure 8:
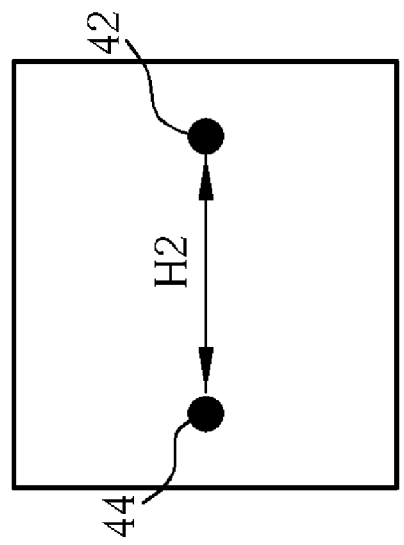

Please refer to FIG. 7 and FIG. 8. FIG. 7 is an optical path diagram of the first central bright band 201 and the second central bright band 281 forming images on the image sensor 32 according to the present invention. FIG. 8 is a diagram of the first central bright band 201 and the second central bright band 281 forming images on the image sensor 32 according to the present invention. The light emitted from the first central band 201 and the second central band 281 through the lens 34, and projected on the object 18, forms a first detected image 42 and a second detected image 44 respectively on the image sensor 32. The distance between the object 18 and the lens 34 of the vehicle 11 is called "S1", which can also be approximately equal to the distance between the object 18 and the vehicle 11. The distance between the lens 34 and the image sensor 32 is called "S2", the distance between the first central bright band 201 and the second central bright band 281 is called "H1", and the distance between the first detected image 42 and the second detected image 44 detected by the image sensor 32 is called "H2". According to the geometric relationship of similar triangles, the following equation can be derived:

$$H1/S1 = H2/S2;$$

$$S1 = S2 * H1/H2.$$

Because the distance "S2" between the lens 34 and the image sensor 32 and the distance "H1" between the first central bright band 201 and the second central bright band 281 are fixed, therefore by measuring the distance "H2" between the first detected image 42 and the second detected image 44, the corresponding distance "S1" between the object 18 and the vehicle 11 can be derived. As shown in FIG. 8, when the distance "H2" between the first detected image 42 and the second detected image 44 increases, it represents that the distance "S1" between the object 18 and the vehicle 11 decreases; on the contrary, when the distance "H2" between the first detected image 42 and the second detected image 44 decreases, it represents that the distance "S1" between the object 18 and the vehicle 11 increases. According to the above-mentioned principle, the distance between the driver's car and other cars or obstacles can be derived; therefore the purpose of the distance measurement can be accomplished. Moreover, when the distance "S1" between the object 18 and the vehicle 11 is less than a threshold value, the determination module 36 is able to alert the alarm interface 38 to show a warning signal in order to remind the driver not to get too close to other objects. Compared to applications used for short distances, such as the parking distance control system, applications for long distances are able to remind the driver to keep a safety distance when driving.

In addition, the determination module 36 can store the position of the vehicle 11 corresponding to the object 18, and the distance S1 between the object 18 and the vehicle 11, in the memory module 40 as reference records for driving, and can also be utilized for determining traffic information in time for the vehicle 11.

The fist diffraction raster 12, the first light source 14, the first optical module 16, the second diffraction raster 22, the second light source 24, the second optical module 26, and the image capturing module 30 can be installed in any part of the vehicle 11. For example, the rear of the vehicle 11 could be equipped for scanning cars coming from the backside and calculating the distance to cars coming from the back side. This depends on car design requirements.

Compared with the prior art, the alarm system for a vehicle according to the present invention utilizes the captured result of the image formed by the diffraction pattern on an object by the image-capturing module to determine whether other cars enter in the alarm region of the vehicle, and the measurement of long or short distances. Therefore, the problems of signals decaying in the air or the intensity of light being influenced by ambient circumstances disappear, and the functions of scanning and distance-measurement can be accomplished precisely, so as to enhance driving safety effectively.

Those skilled in the art will readily observe that numerous modifications and alterations of the device and method may be made while retaining the teachings of the invention.

What is claimed is:

1. An alarm system for a vehicle comprising: a first diffraction raster; a first light source for emitting light to the first diffraction raster so as to form a first diffraction pattern on an object., wherein the first diffraction pattern comprises:
    a first central bright band;
    a first side bright band at one side of the first central bright band; and
    a second side bright band at another side of the first central bright band;
    an image capturing module for capturing the first diffraction pattern; and
    a determination module electrically connected to the image capturing module for determining a relative position of the vehicle corresponding to the object according to the first diffraction pattern with the first side bright band or the second side bright band captured by the image capturing module wherein a warning signal is generated according to the first diffraction pattern.

2. The alarm system of claim 1 wherein the first light source is a laser light source.

3. The alarm system of claim 1 further comprising a first optical module for transforming light emitted from the first light source into parallel light beams.

4. The alarm system of claim 1 further comprising an alarm interface for generating a warning signal when the determination module determines that the image capturing module has captured the first side bright band or the second side bright band.

5. The alarm system of claim 1 further comprising:
    a second diffraction raster;
    a second light source for emitting light to the second diffraction raster so as to form a second diffraction pattern on the object, the second diffraction pattern comprising:
    a second central bright band;
    a third side bright band at one side of the second central bright band; and
    a fourth side bright band at another side of the second central bright band;
    wherein the image capturing module is also for capturing the second diffraction pattern, and the determination module is for determining a distance between the vehicle and the object according to images of the first central bright band and the second central bright band captured by the image capturing module.

6. The alarm system of claim 5 wherein the image capturing module comprises:
    an image sensor; and
    a lens for receiving light transmitted from the first central bright band and the second central bright band so as to form a first detected image and a second detected image respectively;
    wherein the distance between the vehicle and the object equals to (a distance between the image sensor and the lens)*(a distance between the first central bright band and the second central bright band)/(a distance between the first detected image and the second detected image).

7. The alarm system of claim 6 wherein the image sensor is a charge coupled device (CCD).

8. The alarm system of claim 6 wherein the image sensor is a complementary mental-oxide semiconductor (CMOS).

9. The alarm system of claim 6 further comprising an alarm interface for generating a warning signal when the determination module determines that the distance between the vehicle and the object is less than a threshold value.

10. The alarm system of claim 5 further comprising an alarm interface for generating a warning signal when the determination module determines that the image capturing module has captured the third side bright band or the fourth side bright band.

11. The alarm system of claim 1 further comprising a memory module for storing the position of the vehicle corresponding to the object.

12. The alarm system of claim 1 wherein the object is a vehicle.

13. An alarm system for a vehicle comprising:
    a first light source for emitting light on an object so as to form a first diffraction pattern on the object, wherein the first diffraction pattern comprises:
    a first central bright band;
    a first side bright band at one side of the first central bright band; and
    a second side bright band at another side of the first central bright band:
    a second light source for emitting light on the object so as to form a second diffraction pattern on the object, wherein the second diffraction pattern comprises:
    a second central bright band;
    a third side bright band at one side of the first central bright band; and
    a fourth side bright band at another side of the first central bright band;

an image capturing module for capturing the first diffraction pattern and the second diffraction pattern; and a determination module electrically connected to the image-capturing module for calculating a distance between the vehicle and the object according to images of the first diffraction pattern and the second diffraction pattern with the first central bright band or the second central bright band captured by the image capturing module wherein a warning signal is generated according to the first diffraction pattern and the second diffraction pattern.

14. The alarm system of claim 13 wherein the first light source and the second light source are both laser light sources.

15. The alarm system of claim 13 wherein the image capturing module comprises:

an image sensor; and a lens for receiving light transmitted from the first diffraction pattern and the second diffraction pattern so as to form a first detected image and a second detected image respectively;

wherein the distance between the vehicle and the object equals (a distance between the image sensor and the lens)*(a distance between the first diffraction pattern and the second diffraction pattern)/(a distance between the first detected image and the second detected image).

16. The alarm system of claim 15 wherein the image sensor is a charge coupled device (CCD).

17. The alarm system of claim 15 wherein the image sensor is a complementary mental-oxide semiconductor (CMOS).

18. The alarm system of claim 15 further comprising a memory module for storing the distance between the vehicle and the object.

19. The alarm system of claim 15 further comprising an alarm interface for generating the warning signal when the determination module determines that the distance between the vehicle and the object is less than a threshold value.

* * * * *